United States Patent
Bloom

(10) Patent No.: US 6,418,956 B1
(45) Date of Patent: Jul. 16, 2002

(54) PRESSURE CONTROLLER

(75) Inventor: Gerald Bloom, Spring Valley, NY (US)

(73) Assignee: Plast-o-Matic Valves, Inc., Cedar Grove, NJ (US)

( * ) Notice: Subject to any disclaimer, the term of this patent is extended or adjusted under 35 U.S.C. 154(b) by 0 days.

(21) Appl. No.: 09/713,776

(22) Filed: Nov. 15, 2000

(51) Int. Cl.[7] .............................................. G05D 16/06
(52) U.S. Cl. ......................... 137/14; 137/488; 137/492; 137/596.18
(58) Field of Search ................................ 137/488, 492, 137/1, 14, 596.18, 627.5

(56) References Cited

U.S. PATENT DOCUMENTS

| | | | | |
|---|---|---|---|---|
| 2,339,753 A | * | 1/1944 | Bloom | |
| 2,599,534 A | * | 6/1952 | Annin | 137/492 |
| 3,525,355 A | * | 8/1970 | Katchka | |
| 3,805,823 A | * | 4/1974 | Kakegawa | |
| 4,000,754 A | * | 1/1977 | Risk | |
| 4,083,375 A | * | 4/1978 | Johnson | |
| 4,157,159 A | * | 6/1979 | Modes | |
| 5,027,852 A | * | 7/1991 | McNeely | |

* cited by examiner

Primary Examiner—Kevin Lee
(74) Attorney, Agent, or Firm—Wolff & Samson

(57) ABSTRACT

A pressure controller is provided for a pressure regulator. The pressure controller controls a pressure regulator to deliver process fluid at a regulated pressure from a variable supply. The pressure controller includes a control pressure source independent of the process fluid. One such pressure source could be compressed air which enters the controller through a restriction. The control pressure passes through the controller to the regulator where it exerts pressure on the pressure regulator. The controller is interconnected with the process fluid line at a point of regulation and senses pressure in a diaphragm chamber of the controller. A valve rides on the diaphragm and a bias is exerted against the valve to oppose pressure on the diaphragm. The bias tends to move the valve to a closed position. The bias means is adjustable. The process fluid pressure in the diaphragm chamber exerts a force on the diaphragm and valve, against the bias, to open the valve. As pressure in the diaphragm chamber rises, corresponding to a rise in the process fluid pressure, the diaphragm is moved to open the valve to allow the flow of control pressure through the valve to atmosphere or drain. If the regulated pressure falls below a set point, the valve closes and control pressure is not vented to atmosphere, but flows directly to the regulator to increase pressure on the regulator to increase the pressure of the process fluid. At set pressure, the valve is partially open to allow sufficient flow to atmosphere or drain to maintain a steady pressure on the pressure regulator. Feedback to the regulator is thus provided based on process fluid pressure sensed by the controller at a point of regulation without the need for electronics.

28 Claims, 4 Drawing Sheets

PRESSURE CONTROLLER

BACKGROUND OF THE INVENTION

1. Field of the Invention

The present invention relates to a pressure controller for a pressure regulator and more specifically to a pressure controller that includes pressure source independent of the process fluid and controls the regulator based on pressure sensed remotely from the regulator.

2. Related Art

In systems for supplying liquid or gas to a point for use from a source which is subject to variable conditions, a pressure regulator is often utilized. The regulator functions to maintain a constant pressure in the fluid despite variations in pressure from the supply.

It has been known to install a pressure transducer downstream of a regulator to read downstream pressure and transfer the reading to an electronic controller which compares the signal with a predetermined setting. The electronic controller sends an electrical signal to a converter which transforms the electrical signal into a pneumatic signal and increases or decreases pressure in the regulator to adjust downstream pressure.

Efforts of others include the following:

Bloom, U.S. Pat. No. 2,339,753, discloses a liquid control apparatus comprising a single unit that regulates pressure of fluid flowing through it in one direction, and utilizes the pressure of the fluid in the other direction, in a separate chamber, to control the regulator. The invention is related primarily to regulators used in industrial furnace installations, such as, those fired with tar or heavy oil.

Katchka, U.S. Pat. No. 3,525,355, discloses a flow control device that can be used in connection with, for example, a fuel control apparatus for a water heater control system. The device includes an inlet, an outlet and a main valve of the pressure-to-close type interposed therebetween. The valve includes a flexible diaphragm and a coil spring. On the back side of the diaphragm is an operating pressure chamber. An external bleed path communicates with the inlet passage. The external bleed path includes a conduit, a thermostatic valve and another conduit that reenters the casing at a passage which eventually leads to the outlet through a pressure chamber and a passage with a flow restrictor therein. The internal bleed path communicates with the inlet through a passage having a porting which communicates with the operating pressure chamber. The internal bleed path also leads to a bleed path valve having a valve seat, a spring and a valve member. The passage leads from the bleed path valve to a regulating valve which includes a valve seat, a valve member and a flexible diaphragm.

Kakegawa, U.S. Pat. No. 3,805,823, discloses a pressure regulator having a main regulator and a pilot regulator. The device includes two chambers in a main regulator divided by a main diaphragm. Flow of fluid passing through the regulator is controlled by the pilot regulator which communicates at one end with the downstream side and at the other end with the upstream side. The pressure differential between the upstream side and the downstream side serves to vary the position of the main diaphragm thereby adjusting the valve to maintain fluid pressure on the low pressure side constant.

Modes, U.S. Pat. No. 4,157,159, discloses a self adjusting fluid flow regulator for use in fluid handling systems capable of maintaining a constant flow rate. The flow regulator may be utilized within an air distribution system such as that which supplies air through ducts to various rooms or portions of an enclosure. The system includes a pressurized air source which supplies air flow through a duct network to various terminal ports.

Risk, U.S. Pat. No. 4,000,754, discloses an automatic control valve for a fluid system such as for a hydraulic elevator system. The device includes a main valve body with first and second chambers interconnected by a port. An adjustable valve restricts the flow of fluid through the port. The adjustable valve is controlled by a fluid responsive valve actuator means. A first bypass conduit interconnects the first chamber and the valve actuator and controls the rate of fluid flow from the first chamber to the valve actuator. A second bypass conduit interconnects the second chamber with the valve actuator. A regulator connected across the first and second bypass conduits and responsive to the rate of fluid flow through the valve, is actuated by a fluid flow rate greater than a pre-determined rate to restrict the second bypass conduit thereby developing a pressure build up in the valve actuator and enabling the valve actuator to close the valves until the pressure unbalance is removed.

Johnson, U.S. Pat. No. 4,083,375, discloses a pilot regulator for pressure regulation servo-control of a valve in a compressible fluid system. The regulator includes a restrictor for supplying fluid from the main valve inlet to a control chamber.

McNeely, U.S. Pat. No. 5,027,852, discloses a safety relief system for a pressure vessel having a safety relief valve in a main flow line from the pressure vessel. The pilot valve includes a separate auxiliary source of high pressure fluid for operating the pilot valve.

What would be desirable, but has not heretofore been developed, is a pressure controller which functions without electronics which senses pressure at a point of regulation and based on said pressure utilizes an independent pressure source to provide a control pressure to a pressure regulator.

OBJECTS AND SUMMARY OF THE INVENTION

It is an object of the present invention to provide a pressure controller for a pressure regulator.

It is another object of the present invention to provide a pressure controller for controlling a pressure regulator which pressure controller does not have electronic components.

It is even another object of the present invention to provide a pressure controller which uses a pressure source, independent of the process fluid, for control pressure.

It is a further object of the present invention to provide a pressure controller for a pressure regulator which uses compressed air to control pressure in the pressure regulator.

It is a further object of the present invention to provide a pressure controller which provides compressed air to a pressure regulator based on process fluid pressure being regulated by the pressure regulator.

It is still a further object of the present invention to provide a pressure controller that uses compressed air wherein compressed air is directed to a pressure regulator or to atmosphere or to both based on the pressure of the process fluid being regulated by the pressure regulator.

The present invention relates to a pressure controller for controlling a pressure regulator to deliver process fluid at a regulated pressure from a variable pressure supply. The pressure controller includes a control pressure source independent of the process fluid, such as compressed air, which enters the controller through a restriction. The compressed air passes through the controller to the regulator where it exerts pressure on the pressure regulator. The controller is interconnected with the process fluid line and senses pressure in a diaphragm chamber of the controller. The pressure on the diaphragm is opposed by a bias such as a spring. The diaphragm is interconnected with a valve. The bias tends to move the valve to a closed position. Pressure on the diaphragm tends to move the valve to an open position. The bias means is adjustable. As pressure in the diaphragm chamber pressure rises, corresponding to a rise in pressure of the process fluid pressure, the diaphragm is moved to open the valve to allow the flow of the control pressure through the valve to a drain, such as atmosphere. If the regulated pressure falls below a set point, the valve closes and the control pressure is not drained or vented to atmosphere, but flows directly to the regulator to increase pressure on the regulator to increase the pressure of the process fluid. At the set pressure the valve is partially open limiting air flow to atmosphere, maintaining constant pressure to the regulator, so the force of the bias is equal to the force of the process fluid on the diaphragm. The design of the invention provides feedback to the regulator based on downstream pressure sensed by the controller without the need for electronics.

BRIEF DESCRIPTION OF THE DRAWINGS

Other important objects and features of the invention will be apparent from the following Detailed Description of the Invention taken in connection with the accompanying drawings in which.

DETAILED DESCRIPTION OF THE INVENTION

The present invention relates to a pressure controller for controlling a pressure regulator to deliver process fluid at a regulated pressure from a variable pressure supply.

Figure 1:
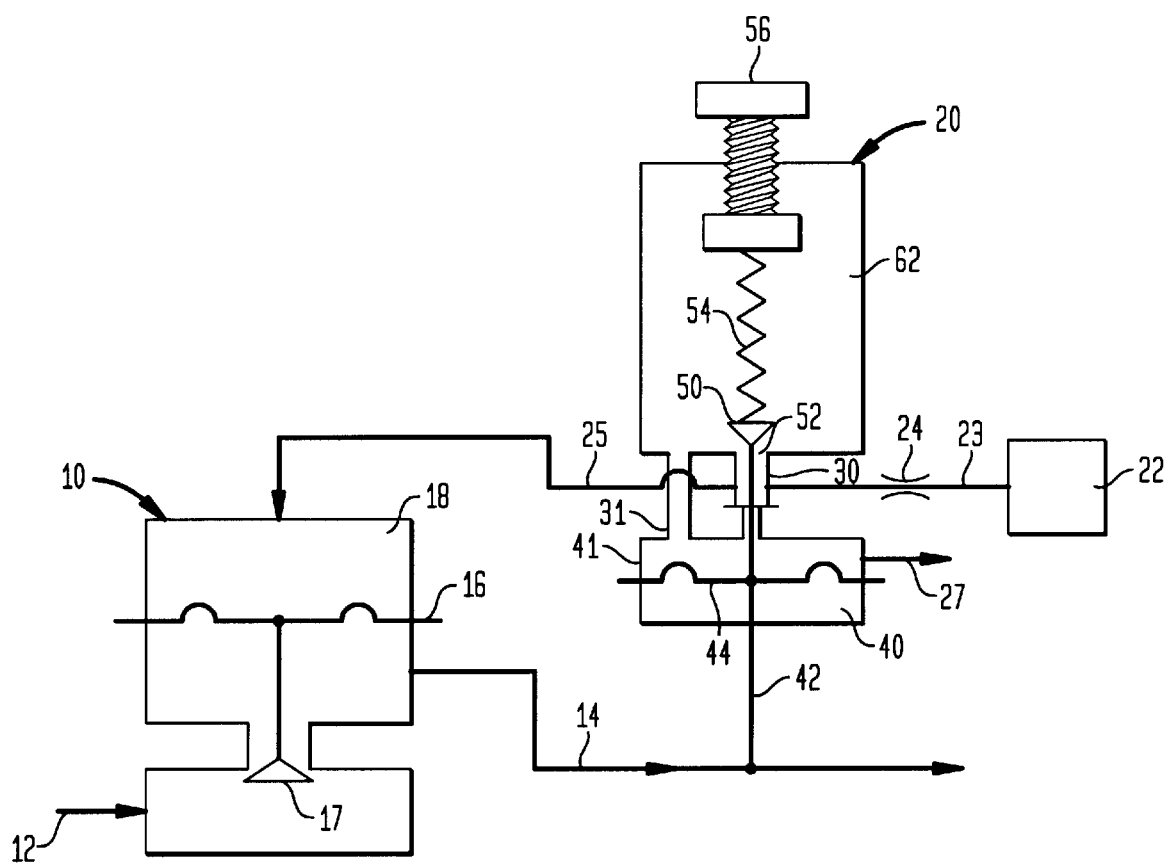
FIG. 1 is a schematic diagram of the pressure controller of the present invention interconnected with a pressure regulator.

The pressure controller of the present invention, along with a pressure regulator, is shown schematically in FIG. 1. A pressure regulator, generally indicated at 10 receives process fluid 12 which flows through the regulator 10 and leaves the regulator 10 as pressurized process fluid 14. The pressure regulator 10 includes a diaphragm 16 which defines a pressure chamber 18. The diaphragm 16 is interconnected with a valve 17. Pressure is exerted on the diaphragm 16 to move the valve 17 to regulate the pressure of the fluid flowing through the regulator 10. Pressure in pressure chamber 18 is controlled by controller 20. A reducing pressure regulator is shown in FIG. 1, the controller of the present invention can be used with any type of regulator including, but not limited to, a back pressure regulator, a pinch valve, air operated valves and other types of pressure controlled valves.

Still referring to FIG. 1, controller 20 includes a spring housing 62, a control chamber 30 and a diaphragm chamber 40, which includes an upper diaphragm chamber 41. A pressure source, such as compressed air source 22, delivers compressed air 23 into the control chamber 30 through restriction 24. While any pressure source can be utilized, including but not limited to any type of gas, city water or other pressurized fluid, compressed air will be discussed herein as one example. Compressed air 23 can flow through the control chamber 30, exit the pressure controller 20 as pressurized air 25 and travel to the pressure chamber 18 of regulator 10. Alternatively, or additionally, compressed air 23 can flow through the control chamber 30, through the spring housing 62, conduit 31, and through the upper diaphragm chamber 41 to atmosphere at 27.

The diaphragm chamber 40 is exposed to process fluid pressure 14 at 42. The process fluid pressure can be sensed downstream, either close to the regulator or further away, even after restrictions which cause pressure reductions. With a back pressure regulator, the process fluid pressure can be sensed upstream of the regulator. The process fluid 14 exerts a pressure in diaphragm chamber 40 against diaphragm 44. Diaphragm 44 applies force to valve 50 which moves in accordance with the movement of diaphragm 44. Valve 50 receives force from a bias 54 which is adjusted by adjustment mechanism 56. The valve 50 seats on seat 52 which separates the control chamber 30 and the upper diaphragm chamber 41. The conduit 31 interconnects spring housing 62 and upper diaphragm chamber 41 to ensure that both are vented to atmosphere or drain. If upper chamber 41 is not at atmosphere (drain) pressure, pressure force on diaphragm 44 will be in error. Alternatively, the spring housing 62 and the upper diaphragm chamber 41 can both be vented to drain Or atmosphere thereby obviating the need for conduit 31.

If process fluid pressure 14 is low, the diaphragm 44 moves to cause the valve 50 to contact valve seat 52 to close the control chamber 30 to direct all compressed air from the control chamber 30 to the pressure chamber 18 of pressure regulator 10. At set pressure, the valve 50 will be partially open to maintain constant control pressure to the pressure regulator 10. Adjustments of the settings can be effected by manipulating the adjustment member 56 typically by rotating same to compress or allow spring member 54 to elongate.

The restriction 24 provides a pressure drop by limiting flow of compressed air as the valve 50 modulates air flow to atmosphere. It also prevents excessive consumption of compressed air and provides a beneficial damping effect.

Figure 2:
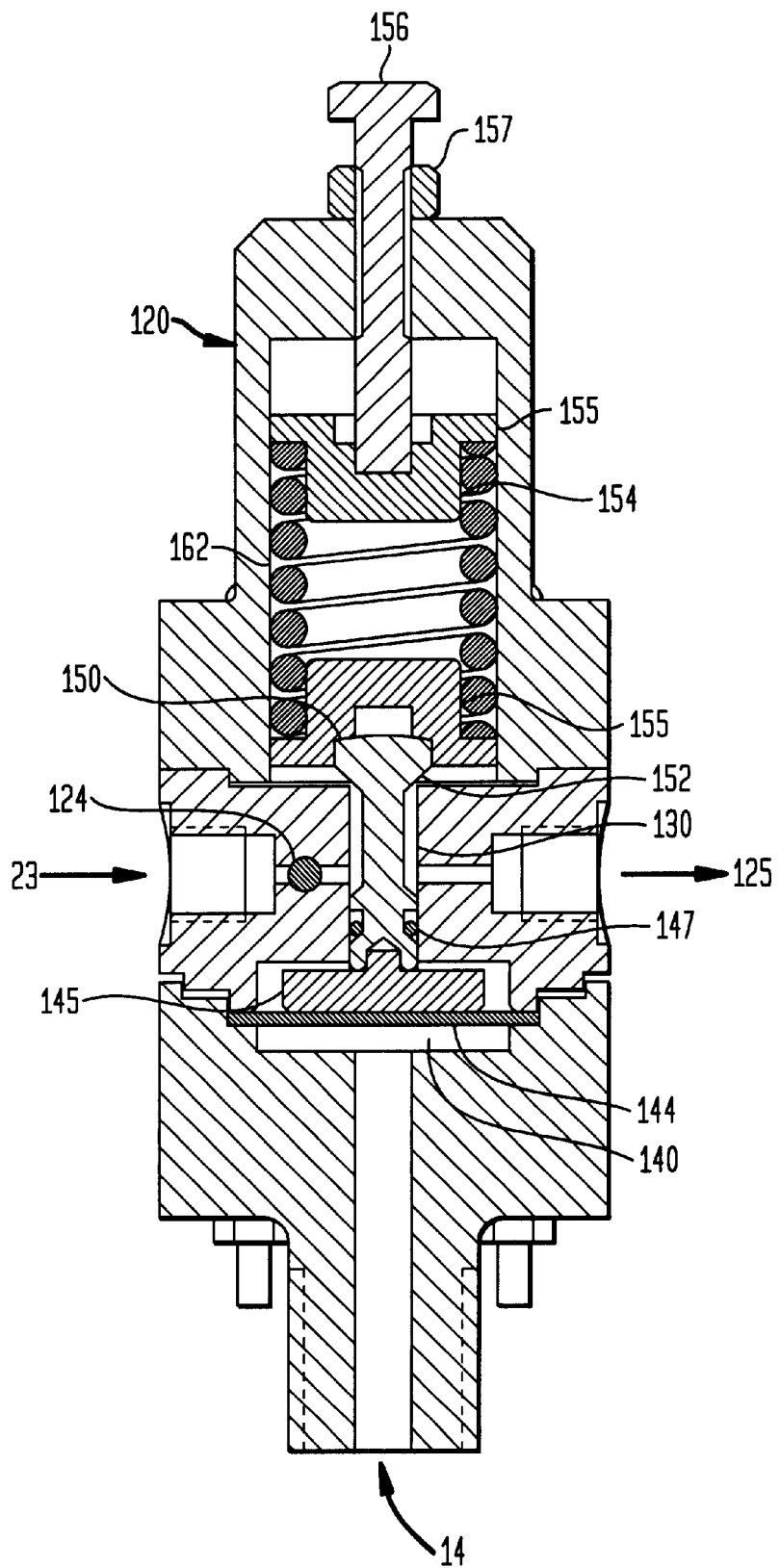
FIG. 2 is a cross-sectional view of another embodiment of the pressure controller of the present invention.

Referring now to FIG. 2, a cross-sectional view of another embodiment of the pressure controller of the present invention is generally indicated at 120. Process fluid 14 is sensed in diaphragm chamber 140 by diaphragm 144. Diaphragm 144 is in contact with valve 150 by way of member 145. O-ring 147 ensures an air tight connection. Spring 154 sits on retainers 155 and extends between adjustment mechanism 156 which extends through lock nut 157 at one end, and the valve 150 at the other end, to bias the valve 150 towards a closed position. Control pressure, such as compressed air 23 enters the controller 120 past restriction 124 through the control chamber 130 to exit the controller at 125 to travel to the pressure regulator. When the process fluid pressure 14 increases, the diaphragm 144 moves the valve 150 off of valve seat 152 to open the valve 150 and allow compressed air to travel through the control chamber 130, past the valve 150 to an exit aperture, not shown in spring housing 162.

Figure 3A:
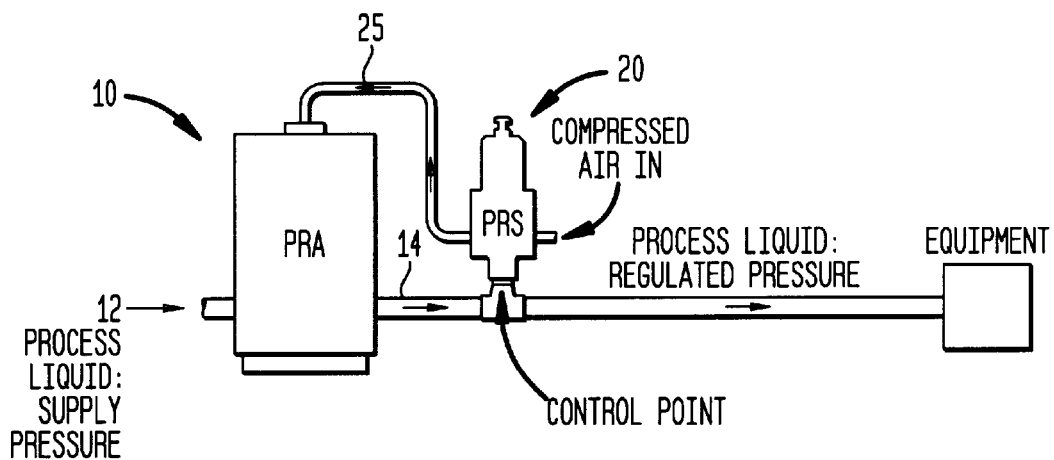
FIGS. 3A and 3B are schematics of the pressure controller of the present invention in a system.

FIG. 3A shows a schematic of the pressure controller 20 of the present invention positioned downstream of a pressure regulator 10 to regulate pressure before the process fluid 14 is used by equipment.

Figure 3B:
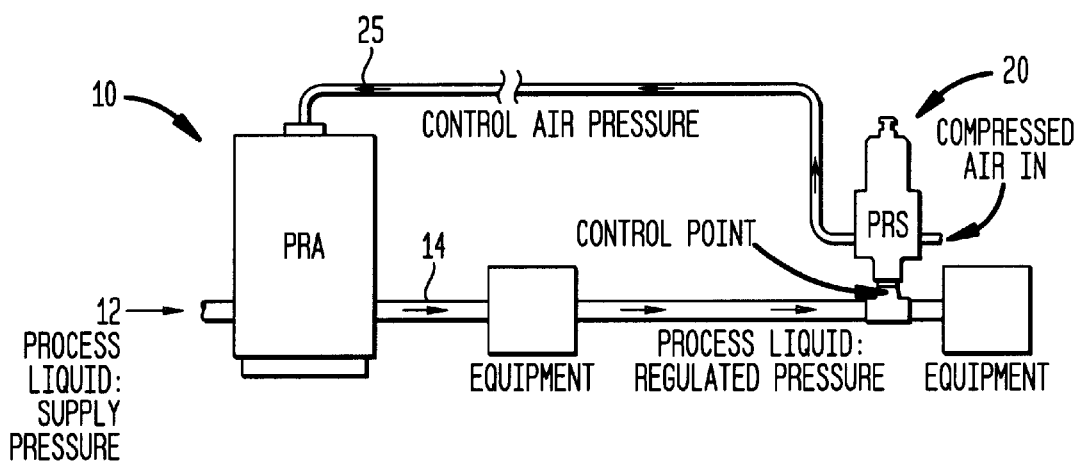

FIG. 3B shows the pressure controller 20 of the present invention situated downstream of a pressure regulator 10 and between equipment that utilizes process fluid so that process fluid 14 pressure can be sensed downstream of the pressure regulator at a control point between the equipment.

Figure 4:
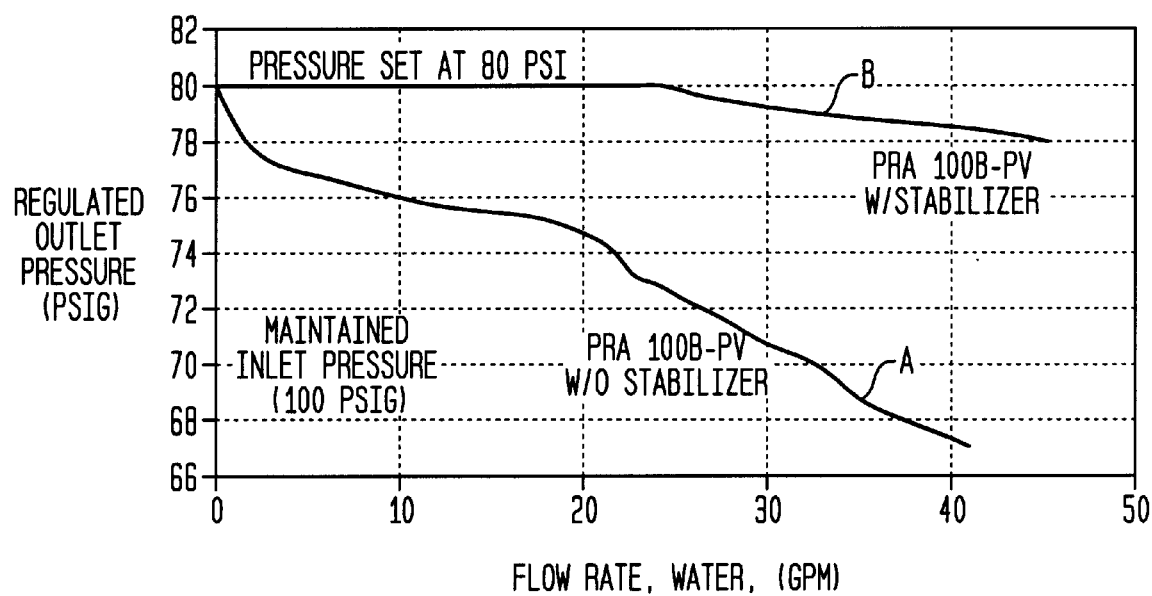
FIG. 4 is a graph of performance of a pressure regulator with and without the pressure controller of the present invention.

FIG. 4 is a graph of regulated flow rate versus regulated outlet pressure for a pressure regulator used without a pressure controller of the present invention shown at A and with the pressure controller of the present invention shown at B.

Importantly, the present invention allows for a pressure controller to control a pressure regulator based on process fluid pressure at the point of regulation without the need for electronics. Additionally, the process fluid is maintained out of contact with the controller fluid, i.e. the compressed air to provide for a clean system.

Having thus described the invention in detail, it is to be understood that the foregoing description is not intended to limit the spirit and scope thereof. What is desired to be protected by Letters Patent is set forth in the appended claims.

What is claimed is:

1. A pressure controller apparatus for controlling a pressure regulator comprising:
   a housing including a control chamber and a diaphragm chamber;
   an inlet in the control chamber for receiving control pressure;
   an outlet from the control chamber to a pressure regulator;
   an inlet in the diaphragm chamber to sense process fluid pressure;
   a diaphragm moveable in the diaphragm chamber based on the process fluid pressure;
   a valve moveable by the diaphragm to open the control chamber to a drain; and
   bias means interconnected with the valve to bias the valve towards a closed position;
   wherein, when process fluid pressure is low, the valve moves toward a closed position to allow control pressure to flow through the control chamber to a pressure regulator to increase pressure on a pressure regulator, and when process fluid pressure is high, the valve moves towards an open position and control pressure flows from the control chamber to the drain.

2. The apparatus of claim 1 wherein the bias means comprises a spring which bears against the valve.

3. The apparatus of claim 2 wherein the bias of the spring is adjustable by an adjustment mechanism.

4. The apparatus of claim 1 wherein the valve is positioned between the control chamber and a spring housing, and a conduit interconnects the spring housing with an upper portion of the diaphragm chamber which is open to drain.

5. The apparatus of claim 1 further comprising a compressed air source for supplying control pressure.

6. The apparatus of claim 5 further comprising a restriction between the compressed air source and the control chamber.

7. The apparatus of claim 6 wherein the control pressure comprises compressed air.

8. A method of controlling a pressure regulator comprising:
   sensing pressure of process fluid at a location where pressure regulation is desired;
   allowing a diaphragm to move in response to process fluid pressure;
   providing a control pressure to a control chamber;
   providing a valve on the control chamber, the valve interconnected with the diaphragm;
   moving the valve in response to process fluid pressure to direct control pressure to a pressure regulator or to a drain, or to both, responsive to the process fluid pressure.

9. The method of claim 8 further comprising normally biasing the valve towards a closed position.

10. The method of claim 9 wherein the control pressure comprises compressed air.

11. The method of claim 10 further comprising the compressed air through a restriction before entering a control chamber.

12. The method of claim 8 further comprising maintaining a constant pressure to the pressure controller.

13. The method of claim 12 wherein the step of maintaining the variable pressure comprises allowing the valve to partially open to direct control pressure to the regulator and to atmosphere.

14. The method of claim 9 further comprising adjusting the biasing of the valve to a desired bias.

15. The method of claim 10 further comprising adjusting the control pressure to a desired pressure.

16. A pressure controller for controlling a pressure regulator comprising:
   a sensor for sensing fluid pressure, the sensor including a diaphragm;
   a control pressure source;
   a chamber for receiving the control pressure;
   a first outlet from the control chamber to a pressure regulator;
   a second outlet from the control chamber for venting the control chamber to drain; and
   a valve at the second outlet, the valve interconnected with the diaphragm and moveable in accordance with the movement of the diaphragm, the valve directing control pressure to a pressure regulator, to atmosphere, or to both, based on process fluid pressure sensed by the diaphragm.

17. The apparatus of claim 16 further comprising a bias to bias the valve to a closed position.

18. The apparatus of claim 16 wherein the bias comprises a spring which bears against the valve.

19. The apparatus of claim 18 wherein the bias of the spring is adjustable by an adjustment mechanism.

20. The apparatus of claim 16 further comprising a compressed air source for supplying control pressure.

21. The apparatus of claim 20 further comprising a restriction between the compressed air source and the control chamber.

22. The apparatus of claim 21 wherein the control pressure comprises compressed air.

23. A method of controlling a pressure regulator comprising:
   providing a control chamber with an inlet for receiving control pressure and two outlets, a first outlet for providing control pressure to a pressure regulator and a second outlet to atmosphere;
   sensing pressure of processed fluid at a location where pressure regulation is desired by sensing pressure of process fluid using a diaphragm at a location where pressure regulation is desired;
   allowing the diaphragm to move in response to the pressure of process fluid; and
   moving a valve at the second outlet of the control chamber in accordance with the movement of the diaphragm to open or close the second outlet based on the pressure of the process fluid.

24. The method of claim 23 further comprising normally biasing the valve towards a closed position.

25. The method of claim 24 wherein the control pressure comprises compressed air.

26. The method of claim 25 further comprising passing the compressed air through a restriction before entering a control chamber.

27. The method of claim 23 further comprising maintaining a constant pressure to the pressure controller.

28. The method of claim 27 wherein the step of maintaining the variable pressure comprises allowing the valve to partially open to direct control pressure to the regulator and to atmosphere.

* * * * *